Patented Oct. 12, 1954

2,691,645

UNITED STATES PATENT OFFICE 2,691,645

FIBER-FORMING COPOLYMERS OF ACRYLO-NITRILE AND BETA - HALOETHYLVINYL ETHER

George E. Ham, Dayton, Ohio, assignor, by mesne assignments, to The Chemstrand Corporation, a corporation of Delaware No Drawing. Application February 23, 1951, Serial No. 212,497

9 Claims. (Cl. 260—79.5)

This invention relates to new acrylonitrile copolymers having desirable utility in the preparation of general purpose fibers. More specifically the invention relates to new dyeable acrylonitrile polymers and methods for their preparation.

Polymers of acrylonitrile, such as polyacrylonitrile and copolymers of 90 per cent or more acrylonitrile and up to ten per cent of other monomers are well-known as fiber-forming compositions. It is also known that the utility of the copolymers depends to a large extent upon the nature of the said other monomer. If vinyl acetate, methyl methacrylate, methacrylonitrile, styrene, and other well-known readily available monomers are used, the polymers are of limited usefulness because of the lack of sufficient dye-receptivity. It is also well-known that monomers such as vinylpyridine, may be copolymerized with acrylonitrile and that the resulting copolymers will be dye-receptive; however, the costs of vinylpyridine and other monomers which develop dye-receptivity are excessive. Accordingly, there is a need for a copolymer which can be prepared from readily available low cost monomers which can be dyed by conventional procedures.

The primary purpose of this invention is to provide a new fiber-forming acrylonitrile copolymer. A further purpose of this invention is to provide a method of preparing acrylonitrile copolymers from inexpensive and available monomers. A further purpose of this invention is to provide useful dye-receptive acrylonitrile fibers.

In accordance with this invention it has been found that copolymers of from 90 per cent to 98 per cent of acrylonitrile and from two per cent to ten per cent of $\beta$-chloroethyl vinyl ether or $\beta$-bromoethyl vinyl ether may readily be prepared and have exceptional utility when treated in the manner described herein.

The new copolymers may be prepared by mass polymerization, solution polymerization, or aqueous suspension polymerization. The latter procedure is generally preferable because it produces copolymers in finely divided form useful for immediate fabrication into synthetic fibers. These aqueous suspension polymerizations are generally conducted in the presence of a water-soluble peroxide catalyst and dispersing agents which prevent the agglomeration of the polymer during polymerization. If desired, regulators, such as mercaptans, and "redox" agents, such as sodium bisulfite, may be present to modify the molecular weight of the resultant copolymers. The polymerization may be conducted in batch lots, by continuous methods or by the semi-continuous methods which are generally preferred.

The polymerization is catalyzed by means of any water-soluble peroxy compound, for example the potassium, ammonium and other water-soluble salts of peroxy acids, sodium peroxide, hydrogen peroxide, sodium perborate, the sodium salts of other peroxy acids, and any other water-soluble compound containing a peroxy group (—O—O—). A wide variation in the quantity of peroxy compound is possible. For example, from 0.1 to 3.0 per cent by weight of the polymerizable monomer may be used. The catalyst may be charged at the outset of the reaction, or it may be added continuously or in increments throughout the reaction for the purpose of maintaining a more uniform concentration of catalyst in the reaction mass. The latter method is preferred because it tends to make the resultant polymer more uniform in its chemical and physical properties.

Although the uniform distribution of the reactants throughout the reaction mass can be achieved by vigorous agitation, it is generally desirable to promote the uniform distribution of reagents by using inert wetting agents, or emulsion stabilizers. Suitable reagents for this purpose are the water-soluble salts of fatty acids, such as sodium oleate and potassium stearate, mixtures of water-soluble fatty acid salts, such as common soaps prepared by the saponification of animal and vegetable oils, the "amino soaps," such as salts of triethanolamine and dodecylmethylamine, salts of rosin acids and mixtures thereof, the water-soluble salts of half esters of sulfuric acid and long chain aliphatic alcohols, sulfonated hydrocarbons, such as alkyl aryl sulfonates, and any other of a wide variety of wetting agents, which are in general organic compounds containing both hydrophobic and hydrophilic radicals. The quantity of emulsifying agent will depend upon the particular agent selected, the ratio of monomer to be used, and the conditions of polymerization. In general, however, from 0.01 to one per cent by weight of the monomers may be employed.

The preferred methods of operation are those which produce a copolymer of very uniform chemical and physical properties. Other characteristics of the copolymer are frequently of great importance, for example the particle size of the dispersion which is primarily concerned with the ease of filtration, the water to monomer ratio which must necessarily be low for the most economical production, and the yield and conversion of the monomers to copolymer.

The new copolymers are preferably prepared by charging a suitably stirred reaction vessel with water containing a small proportion of the required amount of the catalyst and dispersing agent and heating the mixture to approximately 70 to 80° C. Thereafter a mixture of acrylonitrile and β-chloroethyl vinyl ether in the required proportions is added gradually to the heated aqueous solution. The polymerization reaction begins immediately with the precipitation of the white finely divided copolymer. A uniform rate of reaction may be attained by regulating the rate of addition of monomers to the reactor. A uniform rate of addition throughout the polymerization reaction will give satisfactory results, but optimum quality and uniformity of the copolymer can best be obtained by adding the monomers at a rate which permits a constantly uniform temperature of reflux. By the latter method a constant reaction temperature and a uniform concentration of monomers in the reactor will be assured. When the predetermined quantity of monomers has been added to the reactor, the reaction is preferably interrupted by cooling the reactor, by rapidly steam-distilling the unreacted monomers, or by destroying the remaining catalyst. If the polymer has been prepared by the preferred method it will not remain in suspension but will precipitate and may then be separated by decantation or by conventional filtering procedures. The polymer is then ready for fabrication into synthetic fibers.

The emulsion polymerizations are preferably conducted in glass or glass-lined vessels which are provided with means for agitating the contents. Generally, rotary stirring devices are the most effective means of insuring the ultimate contact of the reagents and the continuous dispersion of the polymer, but other agitation methods may be successfully employed, for example by devices which rock or tumble the reactors. The polymerization equipment generally used is conventional to the art and the adaptation of a particular type of apparatus to the new polymerization reaction is within the province of one skilled in the art.

The new copolymer may be fabricated into synthetic fibers by first dissolving the polymer in a suitable solvent, for example N,N-dimethylformamide, dimethylacetamide, ethylene carbonate, butyrolactone, and N,N-dimethylmethoxyacetamide, and the solutions extruded through a suitable die or a spinneret having a plurality of apertures into a medium which removes the solvent and precipitates the copolymer in a continuous form. The precipitation medium may be liquid, for example, glycerine, water, aqueous solutions of salts, acids, or bases, or aqueous mixtures of organic liquids, such as solvents for polyacrylonitrile, or it may be a gaseous medium, for example air or nitrogen. Fibers are usually stretched to develop optimum physical properties which operation may be conducted in the spinning medium before the copolymer has fully coagulated or it may be conducted as a separate following operation, for example during a subsequent washing operation or during a subsequent heat treating operation. A useful method of stretching the fiber is one involving a simultaneous treatment with a steam atmosphere at a temperature from 100 to 200° C. After the stretching operation, the fiber may be further conditioned by allowing it to shrink at an elevated temperature, for example in a steam atmosphere at 100 to 200° C.

If the fiber is spun directly from a copolymer of acrylonitrile and β-chloroethyl vinyl ether a dyeable fiber will not be prepared, but the fiber may be converted into a dye-receptive form by first reacting it with ammonia, an aliphatic amine, 2-mercaptobenzothiazole, thiourea or tris(dimethylamido)-phosphite. These methods of treatment convert the β-chloroethyl grouping into salt groupings which are reactive with conventional acid dyestuffs. Thus, dye-receptive general purpose fibers are prepared. The conversion of the copolymer of acrylonitrile and β-chloroethyl vinyl ether may be performed prior to the fiber spinning operation. It may involve the reaction of the solid granular polymer direct from the polymerization operation or it may be performed in the presence of a mutual solvent. Any of the conventional acrylonitrile polymer solvents will be useful. Because of the ease of dispersing the reagents with the copolymer, the use of a mutual solvent is the preferred method of converting the new copolymer into dye-receptive form. The useful reagents for this treatment include tertitary amines, and tris(dimethylamido)phosphite, but the other reagents are not recommended because they often induce the premature gelation of the spinning solutions or are insoluble in the solvent used. Reaction with thiourea is most advantageously accomplished in the dyebath.

Further details of the practice of this invention are set forth with respect to the following examples:

Example 1

A mixture of 180 parts by weight of acrylonitrile and 20 parts of β-chloroethyl vinyl ether was added at 83° C. gradually to an aqueous medium containing 340 parts of water and 0.2 part of a mahogany soap. The reaction was conducted in a stirred glass vessel provided with a reflux condenser and two dropping funnels. The reaction was catalyzed by two parts of potassium persulfate dissolved in 60 parts of water, which solution was added in six equal increments during polymerization. After all of the reactants and reagents had been added the mixture was allowed to reflux for one-half hour and then steam distilled, filtered, washed with water, and then dried. Analysis of the polymer indicated that 93.5 per cent of acrylonitrile and 6.5 per cent of β-chloroethyl vinyl ether had polymerized.

A solution of 21 per cent of the copolymer in N,N-dimethylacetamide was prepared and extruded through a spinneret having 30 apertures each 0.0035 inch in diameter. After washing with water, the fibers were stretched 256 per cent and then shrunk in a steam atmosphere at 131° C. The fiber so prepared was strong and resilient but was not dye-receptive.

Example 2

A one-gram skein of fiber prepared in accordance with the preceding example was suspended in a stream of gaseous ammonia for ten minutes at 100° C. Upon immersing the fiber for ten minutes at 100° C. in a dyebath containing 41 grams of water, 0.02 gram of Wool Fast Scarlet Dye and 0.1 gram of sulfuric acid, the fiber was effectively dyed in two hours at 90° C. An identical dyeing experiment of the untreated fiber did not produce a dyed fiber.

Example 3

A skein (0.45 gram) of fiber prepared in accordance with the procedure of Example 1 was treated with the dyebath described in the preceding example except that 0.35 gram of thiourea was added thereto in two hours at 90° C. A bright scarlet color was developed.

Example 4

A copolymer of 93.5 parts by weight of acrylonitrile and 6.5 parts of vinyl β-chloroethyl ether was dissolved in N,N-dimethylacetamide at 80° C. to form an eighteen per cent solution. The solution was cooled to 60° C. and 2.79 per cent (by weight of the solution) of tris(dimethylamido)phosphite was added thereto. The mixture was allowed to remain at 60° C. for six hours. The solution was then extruded through a spinneret having 30 apertures each 0.0035 inch in diameter. The fiber so formed was stretched 150 per cent during the washing period, dried on steam-heated rolls and then stretched 381 per cent in a steam atmosphere. The resulting fiber was found to have excellent receptivity in Wool Fast Scarlet G Supra dye when treated for one hour in a dyebath containing 0.02 gram of dye, 0.1 gram of sulfuric acid and 40 ml. of water per gram of fiber.

The invention is defined by the following claims.

What I claim is:

1. A copolymer of from 90 per cent to 98 per cent of acrylonitrile and from two to ten per cent of β-chloroethyl vinyl ether.

2. A fiber comprising a polymer of from 90 per cent to 98 per cent of acrylonitrile and from two to ten per cent of β-chloroethyl vinyl ether.

3. A dye-receptive fiber comprising a copolymer of from 90 per cent to 98 per cent of acrylonitrile and from two per cent to ten per cent of β-chloroethyl vinyl ether, said fiber having its surface chemically reacted by contacting it with a reagent of the class consisting of ammonia, 2-mercaptobenzothiazole and thiourea.

4. A dye-receptive polymer comprising a copolymer of from 90 per cent to 98 per cent of acrylontrile and from two to ten per cent of β-chloroethyl vinyl ether, said polymer being chemically reacted by contacting it with thiourea.

5. A copolymer of from 90 per cent to 98 per cent of acrylonitrile and from two per cent to ten per cent of β-bromoethyl vinyl ether.

6. A fiber comprising a polymer of from 90 per cent to 98 per cent of acrylonitrile and from two per cent to ten per cent of β-bromoethyl vinyl ether.

7. A dye-receptive fiber comprising a copolymer of from 90 per cent to 98 per cent of acrylonitrile and from two per cent to ten per cent of β-bromoethyl vinyl ether, said fiber being chemically reacted by contacting it with a reagent of the class consisting of ammonia, 2-mercaptobenzothiazole and thiourea.

8. A dye-receptive polymer comprising a copolymer of from 90 per cent to 98 per cent of acrylonitrile and from two per cent to ten per cent of β-bromoethyl vinyl ether, said polymer being chemically reacted by contacting it with thiourea.

9. A copolymer of from 90 to 98 per cent of acrylonitrile and from two to 10 percent of a compound of the group consisting of beta-chlorethyl vinyl ether and beta-bromoethyl vinyl ether.

References Cited in the file of this patent

UNITED STATES PATENTS

| Number | Name | Date |
| --- | --- | --- |
| 2,436,204 | D'Alelio | Feb. 17, 1948 |
| 2,588,398 | Mast et al. | Mar. 11, 1952 |
| 2,643,986 | Ham et al. | June 30, 1953 |